(12) United States Patent
Tyebji

(10) Patent No.: US 7,197,041 B1
(45) Date of Patent: Mar. 27, 2007

(54) SYSTEM AND METHOD FOR DEVELOPING AND EXECUTING A WIRELESS APPLICATION GATEWAY

(75) Inventor: Abeezar S. Tyebji, Houston, TX (US)

(73) Assignee: Shipcom Wireless Inc, Houston, TX (US)

( * ) Notice: Subject to any disclaimer, the term of this patent is extended or adjusted under 35 U.S.C. 154(b) by 1089 days.

(21) Appl. No.: 10/232,464

(22) Filed: Aug. 30, 2002

(51) Int. Cl.
*H04L 12/56* (2006.01)

(52) U.S. Cl. .................................... 370/401; 370/310.2

(58) Field of Classification Search ............ 370/310.2, 370/328, 338, 401, 402, 419, 359, 241, 465
See application file for complete search history.

(56) References Cited

U.S. PATENT DOCUMENTS 6,766,165 B2 * 7/2004 Sharma et al. .............. 455/423
7,006,479 B1 * 2/2006 Joo et al. .................... 370/338
2002/0057803 A1 * 5/2002 Loos et al. .................. 380/270
2003/0214970 A1 * 11/2003 Pimentel ..................... 370/465
2006/0182055 A1 * 8/2006 Coffee et al. ................ 370/328

* cited by examiner

*Primary Examiner*—Brenda Pham
(74) *Attorney, Agent, or Firm*—William L. Botjer

(57) ABSTRACT

The invention provides a system and method that enables a business developer to develop and execute a Wireless Application Gateway (WAG) without programming or writing code. The WAG, as developed and executed through this invention can support a variety of wireless devices and a variety of backend systems. The business developer can, without writing code, configure screens for a plurality of mobile devices and define the business logic to carry out a process involving communication between backend systems and mobile devices. Without the need of programming, the business developer can select and work with a plurality of backend systems and business processes at runtime of the WAG.

7 Claims, 10 Drawing Sheets

SYSTEM AND METHOD FOR DEVELOPING AND EXECUTING A WIRELESS APPLICATION GATEWAY

BACKGROUND

This invention relates to the field of wireless access of enterprise data systems and corresponding applications. More specifically, this invention relates to developing a wireless application gateway to enable wireless access of customized data from multiple remote enterprise systems.

In today's world, most enterprises deploy several applications for executing their business processes. An enterprise may deploy, for example, a supply chain management (SCM) application for managing its inventories and it may also deploy a Customer Relationship Management (CRM) application for managing relationships with its customers. Some well-known examples of applications used for SCM and CRM include those developed and sold by SAP of Germany, Siebel Systems of San Mateo, Calif., USA and Oracle Corporation of Redwood City, USA.

Typically, these large enterprise applications and systems reside on an Information Technology platform and use Operating systems such as Windows 2000, Microsoft NT, Linux, etc. Furthermore, these applications and their corresponding data may reside in various database systems at different sites or different locations (within or even outside the enterprise). For example, an enterprise that deploys an SCM application may have a production facility in China, a sales office in France, and its headquarters in the USA. The employees, contractors, dealers, suppliers, and even customers of such an enterprise usually need to exchange information (from their respective locations).

To address this issue of information exchange over geographically distant locations, enterprises use wired networks to connect their systems (as well as employees, clients and others) to the Internet or enterprise intranets. These local and wide area networks allow the connected parties to access data and execute applications, as desired. Although a wired connection solves the problem of accessing the enterprise Information Technology resources to a great extent, this solution is clearly limited, as mobile users cannot use it. For example, this solution will not help a salesperson-who is traveling to a customer site and who may want to access information about a product (that his/her company may be currently selling or is in the process of developing).

Emerging wireless technologies overcome the abovementioned drawback to a certain extent since they allow the user to access enterprise Information Technology resources through mobile devices (such as Personal Digital Assistants (PDAs), Palm tops, mobile phones, and handheld scanners). Currently, wireless services are based on different wireless technologies such as General Packet Radio Services (GPRS), Cellular Digital Packet Data (CDPD), Code Division Multiple Access (CDMA) and Global System of Mobile communication (GSM) and are primarily used for accessing general portal information; general portal information is simply "common information" that can be accessed by any user (for his/her personal use). Examples of such information include stocks quotes, the weather report and sports scores. While accessing and presenting such general portal information, a minimal amount of personalization and processing is required.

Of course, incorporating the heretofore-mentioned technologies and devices for accessing an enterprise's business information 'anywhere' and 'anytime' provides many advantages to the enterprise. These advantages include lower sales costs, improvements in productivity and shortening of supply chain and customer response cycle times. However, there are four sets of issues that need to be addressed in order to properly integrate wireless systems with enterprise backend systems. These issues are related to (a) processing and customizing the information to be presented to the user, (b) integrating different mobile devices having different screen sizes and other resources, (c) handling a number of wireless technologies (e.g. CDPD, GSM, GPRS, and CDMA) and taking care of issues related to security and Quality of service (QoS) for each of these technologies, and (d) seamlessly integrating a multitude of interfaces within the enterprise system and the wireless system for the proper functioning of the entire system. Since these four sets of issues are fairly important and complex, they are described in detail in the following paragraphs.

The first set of issues arises while integrating the wireless system with the enterprise backend systems. There are four main complexities that need to be handled while integrating these systems. First, the business information from an enterprise needs to be processed and customized for each individual user who is accessing the business information. Second, the business information may have access and security issues associated with it for individual users. (For example, the president of Human Resources may have different access rights than a warehouse manager.) Such issues also need to be addressed while integrating the wireless systems with the backend systems. Third, enterprise information has to be often retrieved from multiple backend systems before transmitting it to the mobile devices. (For example, an enterprise may use Siebel systems for customer service orders but may use SAP R/3 system for inventory management. In such a scenario, a sales person who is trying to fill a customer's order needs information from both systems. However, the methods of accessing information from these two systems are likely to vary greatly.) Finally, since mobile devices are resource-constrained, the retrieved information needs to be compressed, transmitted and presented appropriately.

The second set of issues arises because different devices (e.g., Desktop PCs, laptops, palmtops, mobile phones, etc.) need to be supported by the system. However, one device tends to be different from the other with respect to its resources (such as screen size, processing speed, etc.) and with respect to its communication mechanism with the network. For example, desktop computers typically have displays with at least 14" screen size, and their resolution is typically between 640×480 and 1024×768 pixels. In contrast, mobile devices typically have a screen size between 25×25 mm and 80×120 mm, and resolutions between 90×60 to 320×240 pixels. Similarly, other resources, (such as available bandwidth for data transmission) of various mobile devices are also constrained as compared to desktop computers. Yet these mobile devices have to support most, if not all, features (such as electronic mails, facsimiles, and Web browsing) that are supported by a desktop computer.

The third set of issues arises because many wireless networks and technologies (such as CDMA, GPS, CDPD, GPRS, etc.) are currently being used for transmitting and receiving data. Thus, the system needs to be capable of transforming data—according to the requirements of different technologies (including the Quality of Service (QoS) guarantees of the network and other related features). Some important parameters that need special emphasis include the security and the speed of the transaction. Network security has to be provided in order to ensure that only authorized users are given access to enterprise resources, whereas, high transaction speed is needed to ensure fast processing and presentation of data in response to a user's request.

Finally, the fourth set of issues arises because information of an enterprise passes through layers of technologies before it reaches the end user. These layers include the server platform, the server application, the enterprise network, the transmission medium, the client device, and the client application. In order to "mobile enable" a given application of an enterprise, the number of interfaces (between different technologies) that need to be developed can become quite large. For example, even if two types of technologies are used for each layer—and this is a very conservative number for a large organization—there would be about sixty-four interfaces that need to be developed and tested in order to "mobile enable" the given application. To provide a solution that supports these issues is a daunting task. Additional features like security and speed only make the task of creating this solution more daunting and it is not surprising that complex programming and coding is required for building such an integrated solution.

Most enterprises do not have the resources to do such complex programming and they have to rely on external software builders (who can build this solution for the enterprise). This, in turn, often proves to be fairly expensive for the enterprise. In situations where the enterprise have the requisite employees for building such a solution, these employees end up spending time on programming, coding, and testing rather than on refining their internal business processes. And, finally, once such a complex interface is built and implemented, the enterprise may not be able to change its business processes and their implementation easily because then the corresponding software would need to be modified.

U.S. Pat. No. 6,336,137, titled "Web Client-Server System And Method For Incompatible Page Markup And Presentation Languages", assigned to Siebel Systems, Inc., California, USA, provides a system for transferring data between a server and one or more clients through a network. The network for transfer of data includes wireless network as well. The information is sent to the wireless networks using Wireless Application Protocol (WAP) and Wireless Markup Language (WML). Here, the clients can be WAP enabled mobile devices that use wireless network to send and receive information from server.

Another patent that provides such a solution is U.S. Pat. No. 6,324,542 that is titled "Enterprise Connectivity To Handheld Devices". This patent is assigned to Wright Strategies, Inc., California, USA. This patent discloses a client-server architecture that provides occasional connections between mobile computing devices and the enterprise computing systems. It supports AppleTalk (ADSP) and Internet (TCP/IP) network connections. This architecture, according to the patent, connects one of the mobile clients to the server having a session module. After the information transaction gets completed the client is disconnected from the server.

The abovementioned patents suffer from one or more of the following drawbacks. They provide access to enterprise systems only through one or two wireless networks. Thus, a user cannot access enterprise systems in case his/her mobile device does not support these wireless networks. In other words, prior art does not provide an end-to-end solution that supports all wireless networks and mobile devices. Another major drawback associated with these patents is that they focus on providing wireless access to the databases rather than providing access at object level (i.e. business components and applications level). This drawback is of major concern, as the enterprises may not allow external applications to access databases directly (since the rules relating to access of databases are stored at the object level). Also, though the patents work with applications, they are limited to providing wireless access to small applications (like email application) and not all complex business applications. Also, a user has to do programming to make use of the prior art solutions with his/her enterprise system. Thus, enterprises need to spend large amount of money to employ or engage software programmers Thus, there is a need for a system that enables a user to develop an integrated solution that allows access of enterprise backend systems through a mobile device. A need exists for a system that enables the design and development of an interface that addresses all the issues related to wireless access. As already described, these issues relate to support for all wireless networks, support for all mobile devices and data presentation in a format that is compatible with device's screen. Also, there is a need for a system that provides wireless access not only to databases but also to complex business applications of the enterprise. A system is required that simplifies interface development process so that a business developer can build all interfaces of an operational system without going into programming and coding details. Further, the system should be able to save the time and money of an enterprise by enabling a business developer to build a fully functional, production ready interface in two to four weeks.

SUMMARY

It is an object of the present invention to provide access to applications and databases in Enterprise Backend Systems through a plurality of mobile devices.

It is another object of the present invention to provide a system for developing and executing a wireless application gateway (WAG) solution for enabling remote access of Enterprise Backend Systems to mobile users.

It is another object of the invention to provide a system that supports a variety of enterprise backend systems, a variety of wireless networks and a variety of mobile devices.

It is another object of the invention to provide a toolkit to develop and configure a WAG solution without writing any code and without doing any programming.

It is another object of the invention to enable a user to view business components of different enterprise backend systems in a consistent manner and work with them without knowing about the intricacies of these business components.

It is still another object of the present invention to provide code transparency to enable code reuse by using code corresponding to a WAG solution for another WAG solution.

It is still another object of the present invention to provide data transparency to present the user with only the data that is required by him/her regardless of the enterprise system the data is derived from.

It is yet another object of the present invention to design, develop and deploy a WAG solution quickly (in a matter of two to four weeks).

The invention provides a system and a method for developing and executing a WAG solution that enables a user to remotely access enterprise backend systems through mobile devices. This invention provides an automated configuration toolkit that enables a developer to develop and customize the WAG solution by using graphical interfaces or wizards. Graphical interfaces and wizards allow developer to select from a set of options using a "point and click" mechanism, thereby building the WAG solution without programming. These options are dynamically generated based on the functional requirements of the WAG solution. These options guide the developer in building the WAG solution correctly thereby significantly reducing the errors (in the development of the WAG solution). The developer specifies backend system(s) and mobile device(s) that need to interface with the specified backend system(s). The developer also designs mobile device screens, through selection of options, based on data to be communicated between the enterprise business applications and the mobile devices. The developer further specifies the work steps to accomplish execution of the WAG solution again through selecting options. The developer preferably does not do any programming.

The automated toolkit includes modules such as a Mobile Device Configurator (MDC), a Backend System Connector Configurator (BSCC), a Business Logic Generator (BLG), and a Mobile Management Studio (MMS). Each module provides a graphical environment, which enables the developer to build the WAG solution using a "point and click" mechanism.

The MDC module provides a developer with the provision of selecting options for designing and configuring mobile device screen layouts for a plurality of mobile devices. The screen layouts are defined using screen elements such as menus, labels, fields, keys and messages.

The BSCC module enables a developer to view the business components of diverse enterprise systems in a consistent manner and configure connectors for enabling dynamic communication between the WAG solution and plurality of enterprise backend applications and databases.

THE BLG module allows a developer to develop business logic for the WAG solution. This business logic is a set of instructions that are to be executed in order to execute the WAG solution. BLG comprises of a set of wizards for assisting a developer in developing a WAG solution, without programming. These wizards present the developer with selectable options that are applicable based on the choice of the wizard, and the options previously selected by the developer. Each wizard is designed for a specific task and by selecting only applicable options, guides the developer in accomplishing that specific task in the development of the WAG solution.

The MMS module is an administration tool that enables the developer to create and manage projects corresponding to the WAG solutions.

The runtime WAG solution is a server-based software product that directly interfaces with enterprise backend systems, extracts data and presents data on a plurality of mobile devices over a plurality of wireless networks.

BRIEF DESCRIPTION OF THE DRAWINGS

The preferred embodiments of the invention will hereinafter be described in conjunction with the appended drawings provided to illustrate and not to limit the invention, wherein like designations denote like elements, and in which.

DESCRIPTION OF PREFERRED EMBODIMENTS

Definitions:

Business Process:

A Business Process may be defined as a sequence of steps that are executed in order to enable an enterprise to conduct a specific part of its business. A set of business processes, thus, forms a particular business function (such as warehouse management, customer information management, etc.).

Enterprise Backend Systems:

Enterprise Backend Systems may be defined as data systems and applications of an enterprise that store the information related to different business processes of an enterprise.

Applications:

Applications may be defined as a set of functions that are defined in an enterprise backend system for executing a business process. For instance, a Supply Chain Management (SCM) application is an application that carries out several pre-specified functions, such as monitoring of inventory levels in an enterprise ordering of raw materials etc. An application consists of a number of sub-applications.

Sub-Applications:

Sub-applications are subsets of Applications. These carry out a pre-specified function of an application. For instance, reporting inventory level in raw material warehouse is a sub-application of SCM application.

Wireless Application Gateway (WAG):

Wireless Application Gateway (WAG) may be defined as a gateway or a path that enables the access of enterprise data systems and applications through mobile wireless devices.

WAG Solution:

WAG solution may be defined as a WAG that enables a business process of an enterprise to be executed remotely by the use of mobile devices.

WAG Projects:

WAG project may be defined as a project to create a WAG solution for a business process. One WAG project is set up to create one WAG solution for one business process.

Wizards:

Wizards are pre-built software programs that are dedicated to guide a developer to build a WAG solution. Each wizard presents the developer with selectable options that are applicable based on the choice of the wizard, and the options previously selected by the developer.

Figure 1:
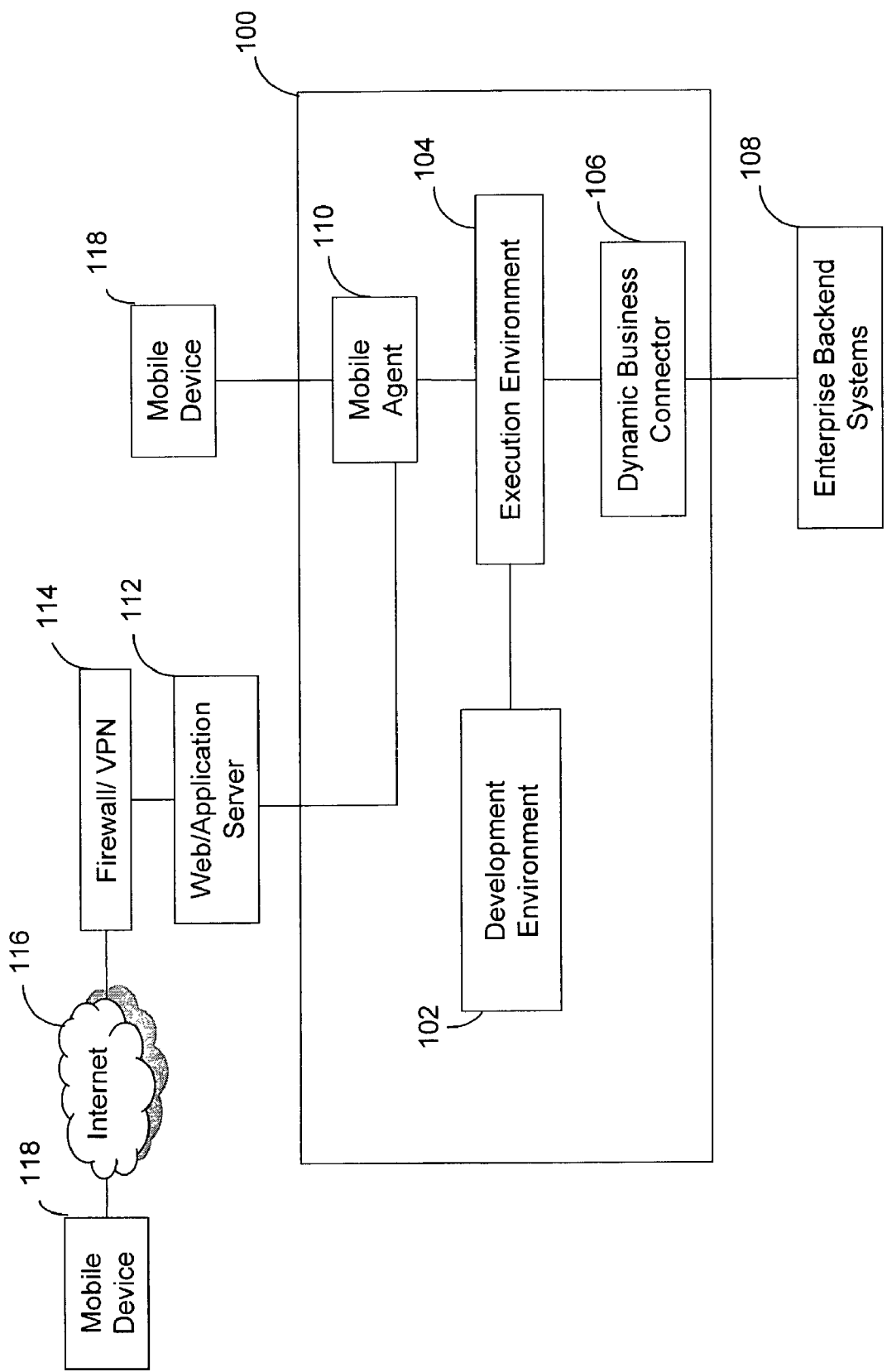
FIG. 1 is a schematic representation of a system for development and execution of a Wireless Application Gateway (WAG) solution in accordance with a preferred embodiment of the present invention.

FIG. 1 illustrates a System 100 for development and execution of a wireless application gateway (WAG) solution. System 100 comprises a Development Environment 102, an Execution Environment 104, a Dynamic Business Connector (DBC) 106 and a Mobile Agent 110. Development Environment 102 is used for development and testing of a WAG solution. This WAG solution, when executed, enables applications and other data in Enterprise Backend Systems 108 to be accessed by a Mobile Device 118. The execution of the developed WAG solution takes place in Execution Environment 104. Execution of a WAG solution involves interfacing of System 100 with Enterprise Backend Systems 108 through DBC 106, and with Mobile Device 118 through Mobile Agent 110. Mobile Device 118 may also be connected to Mobile Agent 110 through the Internet 116 (using a Web Server or an Application Server 112 and a Firewall or a Virtual Private Network 114) or through enterprise Intranets.

In a preferred embodiment, system 100 is implemented on a data processing system having a memory and a processing capability. The memory is used for storing data related to the WAG solution. The processing capability is used for executing (steps of) the WAG solution. The memory and processing capability required by the data processing system is determined by the complexity associated with the WAG solution. A complex WAG solution, for instance, may require a higher memory and processing capability than that required by a WAG solution of low complexity. The components of system 100, namely Development Environment 102, Execution Environment 104, Dynamic Business Connector (DBC) 106 and Mobile Agent 110, are implemented on the data processing system in form of software modules. A user interacts with system 100 (implemented on the data processing system) by the use of an operating system. Some commonly used operating systems are Windows® operating system, Linux operating system, UNIX operating system, etc. A user is thus able to configure and exchange data with system 100.

The data processing system may be present on a network, such as a Local Area Network (LAN), a Wide Area Network (WAN), a Wireless Local Area Network (WLAN), a Wireless Wide Area Network (WWAN), etc. The data processing system interacts with Enterprise Backend Systems 108 using DBC 106, and with the mobile devices using Mobile Agent 110.

Still referring to FIG. 1, the WAG solution is developed using a plurality of modules provided by Development Environment 102. Each module is tailored to perform a specific function in the process of developing the WAG solution. These modules enable a developer to develop the WAG solution using Graphical User Interfaces (GUIs). The developer uses a "point and click" mechanism to select options and, thus, does not need to write a program in order to develop the WAG solution. When the WAG solution is developed using GUIs, a corresponding code is automatically generated by a Run-time Code Generator of System 100 and this code is usually in XML; this Run-time Code Generator is not shown in FIG. 1. This code defines the process that will be executed by the WAG solution in Execution Environment 104. The process of developing the WAG solution is described in greater detail in conjunction with FIG. 2. After the WAG solution is developed, it is tested in Development Environment 102 to check if the design (of the WAG solution) meets the demand of end-users. This testing is done by simulating the Execution Environment 104 in Development Environment 102. Any flaws or inconsistencies in the performance of the WAG solution are brought out during testing and these are corrected by making appropriate modifications in the WAG solution.

Once the development and testing of the WAG solution is complete, the generated code is directly copied into Execution Environment 104. In a preferred embodiment, there is no alteration of code during this copying process. Further, in a preferred embodiment, the modules of Development Environment 102 are not connected to Execution Environment 104 at run-time in order to avoid any accidental changes in the WAG solution.

Execution Environment 104 executes the WAG solution that has been developed and tested by Development Environment 102. The WAG solution in the Execution Environment 104 may be called 'run-time WAG solution'. This run-time WAG solution is essentially a server based software product that is implemented on server of System 100. The run-time WAG solution interfaces with Enterprise Backend Systems 108 using DBC 106 in order to extract data from enterprise backend systems 108. A WAG solution may require data from various enterprise backend systems, such as SAP system, Oracle system and Siebel System. System 100 accesses multiple enterprise backend systems, retrieves the relevant data and "filters" it according to the user's requirements. System 100 uses Mobile Agent 110 to send the "filtered" data to Mobile Device 118. The "filtering" of the data and other steps related to the execution of a WAG solution are discussed in conjunction with FIG. 10.

Figure 2:
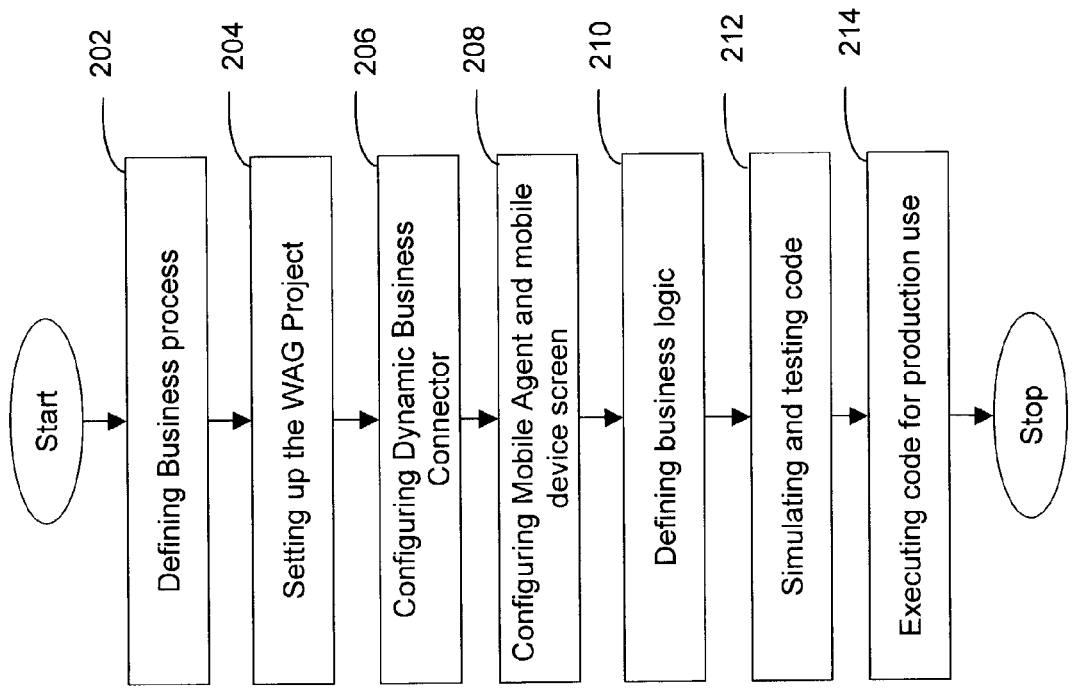
FIG. 2 is a flowchart that shows the process for developing and executing a WAG solution in accordance with a preferred embodiment of the present invention.

FIG. 2 shows the flowchart illustrating the process for developing and executing a WAG solution. A WAG solution is generally developed by a business developer who has domain knowledge of various business processes in the enterprise that need to be "mobile enabled". As already described, the business developer does not need to write any code. Instead, the developer uses System 100 to develop a WAG solution using GUIs. At step 202, the developer defines the enterprise business processes that need to be "mobile enabled". This step defines the functional requirements of the WAG solution. This step also includes gathering of data related to the development of WAG solution. Examples of such data include list of business processes that need to be "mobile enabled", information to be accessed or updated through the WAG solution etc. In particular, this step involves determining the applications and data in the backend systems that will be accessed by this WAG solution.

At step 204, a new WAG project is set up in an administration component of Development Environment 102 corresponding to the WAG solution defined in step 202. For each project that is set up, the business developer is required to input the data gathered in step 202, in the administration component. The administration component will be discussed further in conjunction with FIG. 3.

Step 206 configures DBC 106 for different Enterprise Backend systems. As described, an enterprise may have a number of backend systems, including those built internally (within the enterprise) as well as those provided by a third party, such as SAP, Siebel Systems and Oracle Corporation. Thus, DBC 106 needs to be configured so that it can access data from different Enterprise Backend Systems 108. For instance, configuring DBC 106 for SAP/R3 may involve defining a SAP server with which connection needs to be established, defining the login details and Application Link Enabling (ALE) configuration details, and identifying the application programming interfaces (APIs) that provide interface to the SAP/R3 business applications. Again, as described, all these settings are done using GUIs and no programming is involved. Recall that a WAG solution may require access to multiple Enterprise Backend Systems 108 at the same time. Thus, DBC 106 is configured such that it is able to access multiple enterprise backend systems at the same time.

In Step 208, the developer configures Mobile Agent 110 for different kinds of mobile devices, such as PALM based devices, Windows CE devices, Pocket PCs, WAP phones, portable computer devices, and others. Screen layouts and screen elements for a wide variety of mobile devices are also defined and configured (by the developer) in this step. These screen elements may be menus, labels, fields, action keys, messages, etc. Again, it is important to note that this configuration step is performed using GUIs and does not require programming (on the part of the developer).

In Step 210, the developer defines and develops the work steps and rules that will be executed when the user activates a screen element. Each executable work step is defined so that the WAG solution can progress from one screen to the next. In other words, in this step, the developer creates the business logic that gets executed as a result of an action associated with a screen element. This business logic is preferably developed through the use of wizards and GUIs. (As defined earlier, wizards are pre-built software programs that are dedicated to guide a developer to build a WAG solution)

At step 212, the code for the WAG solution is tested to verify that the design meets the requirements and specifications of the end-users. Minor changes in the requirements and specifications may be made after testing and these changes can be implemented by going back to steps 206, 208 and 210. Once the testing of the WAG solution has been completed, step 214 deploys the WAG solution created in the Development Environment 102 in the Execution Environment 104. This step executes the code (generated for the developed WAG solution) in the Execution Environment 104, thus implementing the WAG solution.

Figure 3:
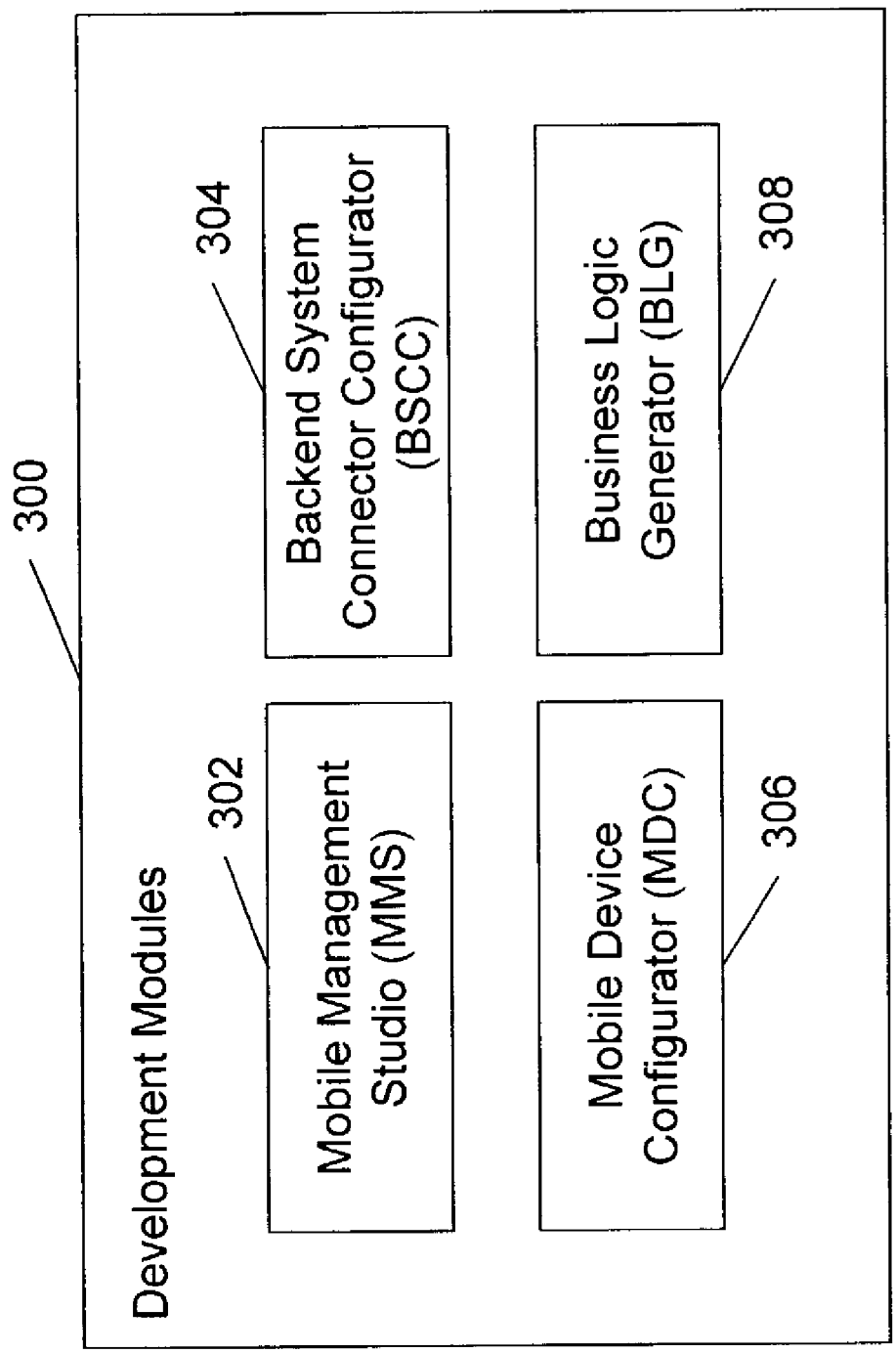
FIG. 3 is a schematic representation of various application development tools provided by Development Environment of the abovementioned system.

As discussed earlier, WAG solution is developed and tested in Development Environment 102. System 100 provides a number of modules that enable a developer to develop a WAG solution. FIG. 3 shows Development Modules 300 provided in the Development Environment 102 of System 100. Development Modules 300 include a Mobile Management Studio (MMS) 302, a Backend System Connector Configurator (BSCC) 304, a Mobile Device Configurator (MDC) 306, and a Business Logic Generator (BLG) 308.

MMS 302 is the administration component that enables the developer to manage WAG solutions for different business processes and define settings specific to a WAG solution. MMS 302 enables a developer to create a new WAG project corresponding to a particular WAG solution. MMS 302 allows the developer to configure each WAG project, administer end-user authorizations and configure servers and printers for the project, based on the functional requirements of a given WAG solution. MMS 302 manages each WAG project independently. Thus, all files and settings of different WAG projects are stored and maintained independently. MMS 302 also carries out other administrative functions like monitoring and tracking transactions during execution of a WAG solution. For such execution, MMS 302 works in conjunction with BSCC 304 and MDC 306. While MMS 302 allows the developer to manage different WAG projects simultaneously, only one WAG project, called the 'active WAG project', can be worked on at a time. The developer may activate and deactivate any WAG project according to his/her requirement.

Figure 4:
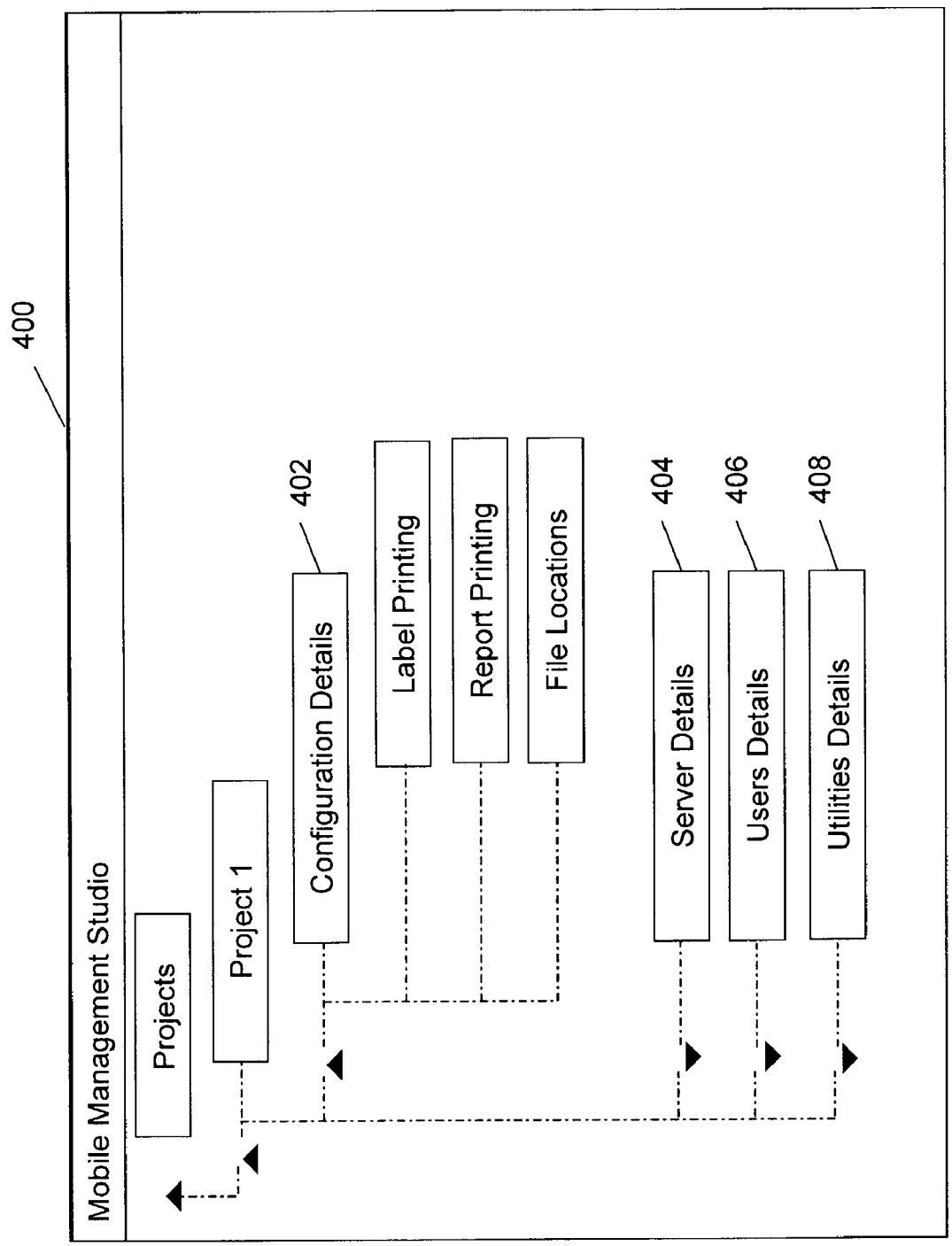
FIG. 4 shows a GUI provided by Mobile Management Studio that assists a developer in specifying details for setting up a new WAG project.

As discussed, MMS 302 allows the developer to create and set up a new WAG project. The process of setting up a new WAG project is explained in conjunction with FIG. 4. The developer creates a new project in GUI 400 provided by MMS 302. The configuration details for the new WAG project need to be provided at the time of creation of the WAG project. The developer needs to specify details like name of the WAG project and name of the server on which database for storing WAG project files and settings resides. The WAG project database may either reside on a local machine (i.e. same server where System 100 is installed) or on a machine on a remote server. In case the WAG project database resides on a remote server, the name of the remote server needs to be provided.

The developer also needs to provide other details to set up the WAG project as per the functional requirements of the WAG solution. These details can be broadly divided into four categories: "Configuration details" 402, "Server details" 404, "User details" 406 and "Utilities details" 408. "Configuration details" 402 represent the information related to setup of the Data Repository, Label and Report printing functions and the file paths/locations to be used by the WAG project. "Data Repository" is the database where all the configurations for the WAG project are stored. The "file paths/locations" indicate the file paths/locations where certain standard functions are present. These standard functions are installed to use external third party software modules for label and report printing.

"Server details" 404 are needed to enable the developer to setup various server applications that are to be used by the WAG project. These server applications include device management application for managing wireless devices, print application for managing printing of reports and web application for managing and supporting browser based devices. The developer also needs to set the properties of various server applications. Examples of properties of these server applications include—Server ID, log level, etc.

"Users details" 406 are required to maintain user information in the WAG project database. (The users can be further grouped as GUI users and mobile users. GUI users are developers of the project who work on desktops and workstation terminals whereas the mobile users are end users who use wireless devices to conduct transactions). The "User details" 406 are used for setting up the properties of the GUI users as well as the mobile users. These properties include user name, password, security level and default language. Details about the language to be used in the WAG project are also provided within "User details" 406.

"Utilities details" 408 allow the developer to setup the different utilities, such as printers and handheld devices, used in a given WAG project. For example, in case of a handheld device the developer needs to specify parameters like screen display specifications for the given device.

MMS 302 also allows the developer to delete any given WAG project. Using a "point and click" mechanism, the developer may remove any project that is no longer required.

MMS 302 also provides a deployment component by which the developer deploys a WAG project created in Development Environment 102 in Execution Environment 104. Using the screens of the deployment component, the developer may select various processes, menus and messages that have to be deployed within the WAG project. This deployment may be for a newly created WAG project. In this case, the WAG project is first developed and then deployed into Execution Environment 104. Also, this deployment may be for an existing WAG project. In this case, only selected components (that have been modified due to a process update) of a WAG project get deployed in Execution Environment 104.

BSCC 304 allows the user to configure DBC 106 to provide connection between System 100 and the Enterprise Backend System. BSCC 304 is a library of interface modules for different Backend Systems. Each interface module allows the developer to develop an interface to a particular Backend System. Thus, BSCC 304 enables a user to configure the connection for any backend system including SAP system, Siebel system and Oracle system. This configuration is required since different backend systems provide different Application Programming Interfaces (APIs). The APIs of different backend systems may use different "business components" to provide access to the corresponding backend system. For example, while the API provided by SAP is based on Business Application Programming Interfaces (BAPIs), the API for Siebel systems is based on a set of "components". These business components have some structure associated with them. The structure define the form of input and output for the given business component. Again, different business components may have different structures associated with them. The exchange of data between the WAG solution and enterprise backend systems 108 is possible only if WAG solution supports the same structure as the backend enterprise system and communicates using the same structure. The manner in which data is structured in an enterprise backend system can be captured by downloading the metadata of enterprise backend system into System 100. BSCC 304 extracts this metadata (i.e. the structures and definitions of Input and output parameters and table structures) of the business components from the enterprise systems, and displays the metadata in a standardized, consistent manner, irrespective of the backend system. This metadata provides information about the way data is structured in an enterprise backend system 108. Thus, metadata for a business component consists of information like definition of the input parameters, definition of the output parameters and definition and description of table structures (in case data is in the form of a table).

The business components required for the execution of a given business process are first identified in each backend system. BSCC 304 allows the developer to download the metadata of these components into System 100. System 100 builds internal structures of the components based on the metadata. This enables the developer to build processes based on these components (as the structure of the information for exchange of data with these components is known). Thus, the developer can configure the process without being affected by the type of backend system he/she is dealing with.

Figure 5:
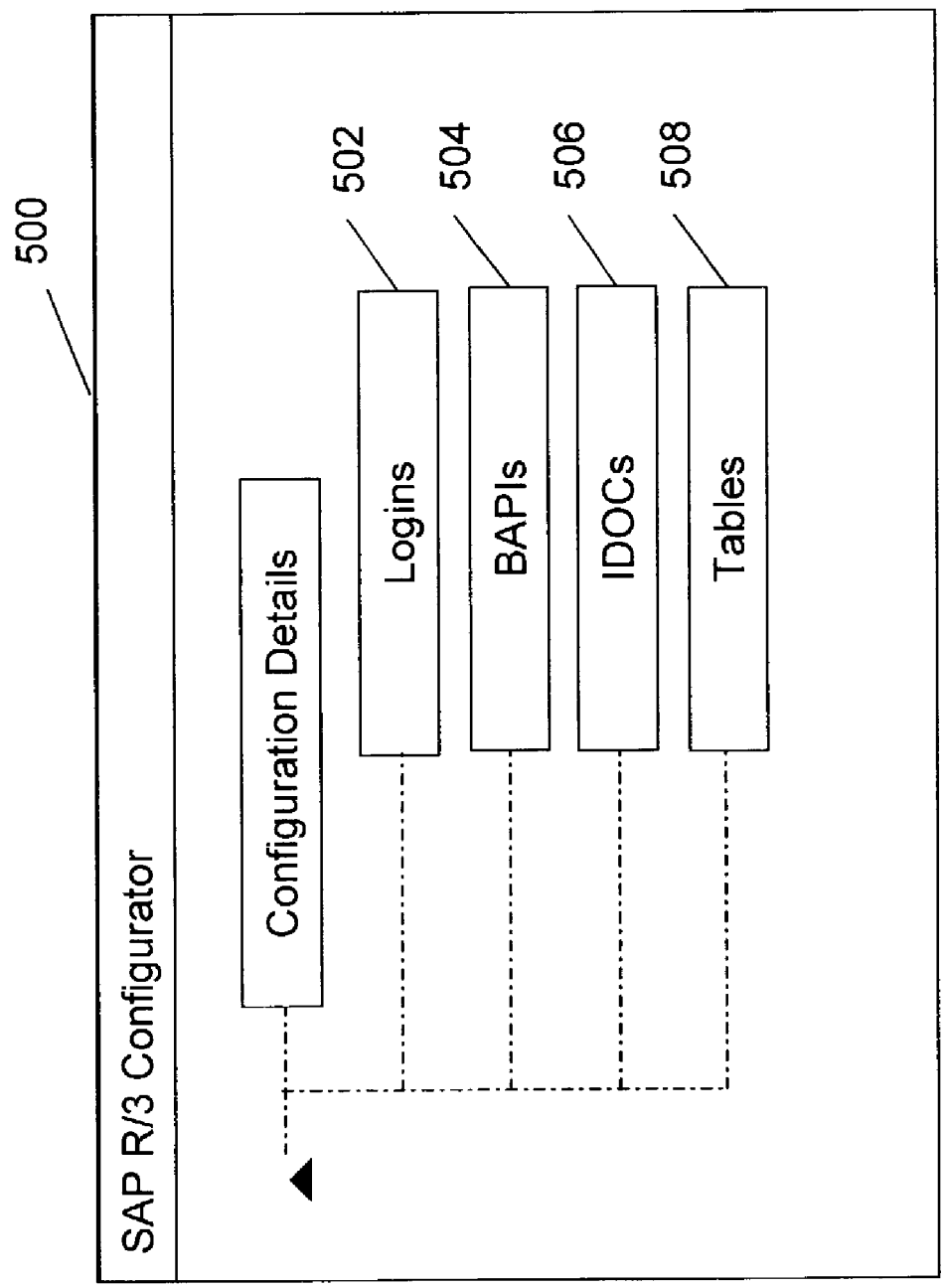
FIG. 5 shows a GUI provided by Backend System Connector Configurator that assists a developer in configuring connection of the abovementioned system with SAP/R3 system.

In order to illustrate the process of configuration more clearly, consider an example of a SAP/R3 backend system. FIG. 5 shows GUI 500 presented to the developer for configuring the connection of System 100 with SAP/R3 backend system. Using the 'Logins' component 502 the developer defines the SAP server with which System 100 needs to establish connection. The developer also provides login details for setting up the login for the project. The developer also configures Application Link Enabling (ALE) module (within SAP) so that SAP can identify (and authenticate appropriately) a request for information from a particular external system. (ALE is a module used by SAP to enable the communication between external vendor software (such as System 100) and SAP). Once these details have been provided using 'Logins' component 502, required metadata information for the business components is downloaded from the SAP system into System 100. The SAP/R3 system contains three kinds of business components—Business Application Programming Interfaces (BAPIs), Remote Function Calls (RFCs) and Intermediate Documents (IDOCs). These business components enable the SAP/R3 system to interact with external software.

The choice between RFC, BAPI or IDOC depends on the parameters of the backend system, and the desired usage of the SAP/R3 system. BAPIs and RFCs are used for synchronous communication with external software. In synchronous communication, the external software waits until the BAPI or RFC gets executed within SAP, and the result is sent back to the external software. The external software cannot proceed with any kind of processing until the result is obtained from the BAPI or RFC. IDOCs are used for asynchronous communication. In asynchronous communication, the external software sends the request to execute an IDOC within SAP. The external software does not have to wait until the IDOC has finished execution. It can proceed and continue processing something else. Once the IDOC finishes execution, it sends a message back to the external software about the status of the execution. The external software may then handle the status appropriately.

Figure 6:
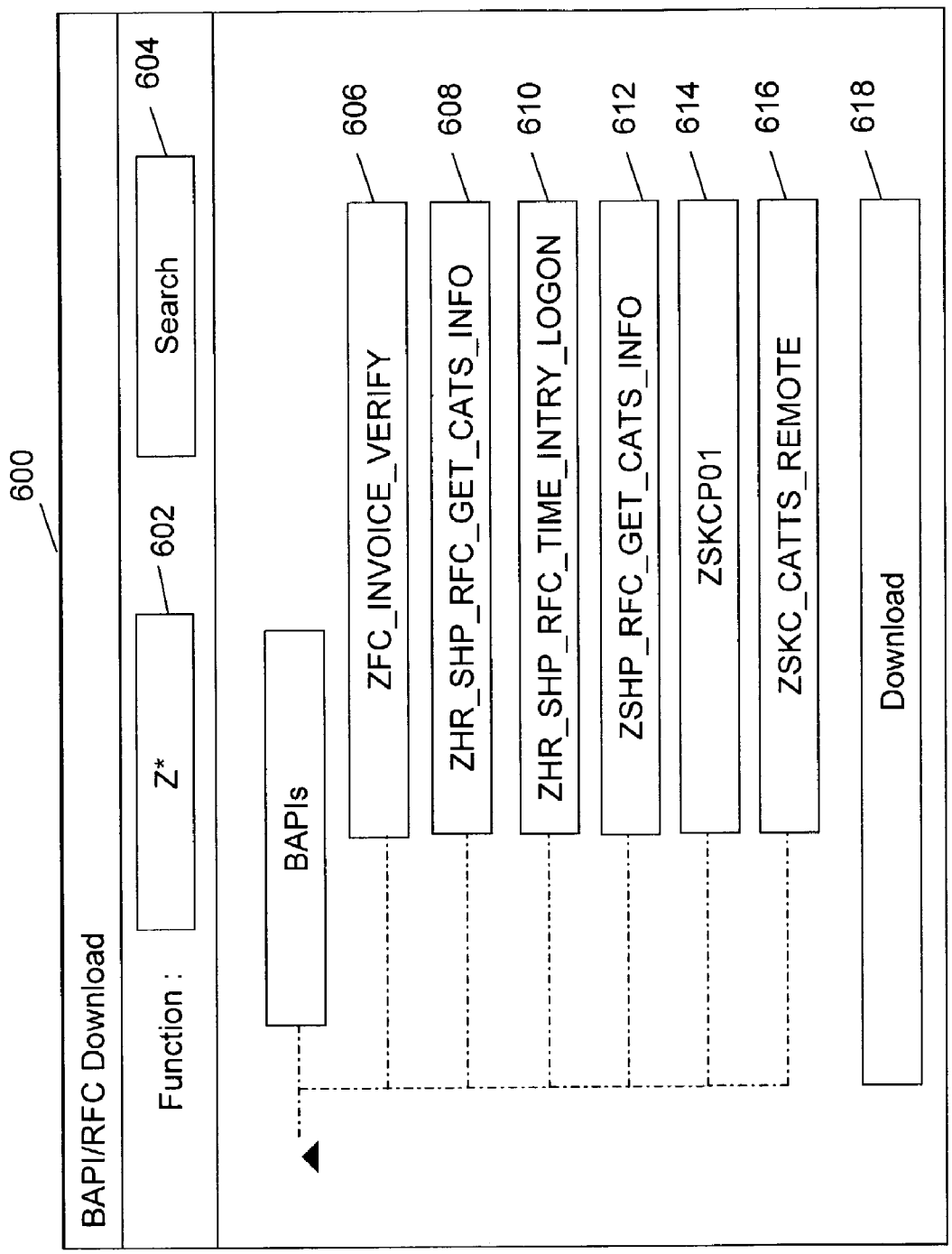
FIG. 6 shows a GUI provided by Backend System Connector Configurator that assists a developer in searching and downloading BAPIs from SAP/R3 system.

RFCs and BAPIs are defined within SAP and allow external software (such as System 100) to send input data into it, execute the respective business function within SAP, and send back the result of the execution to the external software. A standard set of BAPIs and RFCs are provided in SAP system for standard transactions. In case, the business process transaction cannot be provided by the standard BAPI/RFC, then custom BAPI/RFC is written using ABAP programming language (language for developing SAP applications) and uploaded in the SAP backend system. Once appropriate BAPIs/RFCs are available in the SAP system, the metadata information (input parameters, output parameters, table structures, etc.) of relevant BAPIs/RFCs is downloaded into System 100 from the SAP backend system. The 'BAPI/RFC' component 504 of System 100 is used for downloading metadata of RFCs and BAPIs from SAP systems. FIG. 6 shows GUI 600 that assists the developer in the process of searching and downloading a BAPI using BAPI/RFC component 504 (in FIG. 5). Consider an example where the developer wants to search for a BAPI having name starting with character 'Z'. The developer needs to enter the character 'Z' followed by an asterick (*) in field 602 and click on the search button 604. The developer is presented with a list of all the BAPIs (606–616) having names starting with character 'Z'. The developer just needs to click on the name of the BAPI/RFC needed for the WAG project and click on the download button 618. This download creates the necessary internal database tables that support BAPI/RFC table structure. This is necessary to make transaction between System 100 and SAP backend system possible.

Continuing the example of SAP/R3 backend system, there is an 'Intermediate Document (IDOC)' component 506 in System 100, which is used for downloading IDOCs for sending data to SAP. IDOCs are defined within SAP and allow external software (such as System 100) to send input data into it, execute the respective business function within SAP, and send back the result of the execution to the external software. Process of downloading IDOC is exactly similar to that of RFC and BAPI.

Specific tables may also be downloaded in system 100 for holding data sent to or received from SAP. A 'Tables' component 508 in System 100 is used for downloading these specific tables. The SAP system provides a standard set of tables to enable the completion of standard transactions. The process of downloading automatically creates the necessary internal database tables that reflect the SAP table structure. Thus, BSCC 304 provides the developer with an interface to connect to SAP and download the metadata. In a similar manner, BSCC 304 can also configure the connection to other backend systems and download metadata required to complete the transactions.

MDC 306 is a toolkit that enables the developer to develop screens for wide variety of mobile devices. MDC 306 provides a GUI that allows the developer to develop and define various screen elements, screen layouts and formats for a mobile device screen. Properties for screen elements such as menus, labels, fields, keys, messages, etc. can be defined without programming knowledge. Using MDC 306, a developer can configure screens for a large number of mobile devices including iPAQs, Palm OS based devices, Windows CE devices, Pocket PCs, WAP phones, Web explorers such as the various versions of Internet Explorer from Microsoft, and handheld (portable) computer devices with an integrated barcode scanner from vendors such as Symbol, Intermec, LXE etc.

Figure 7:
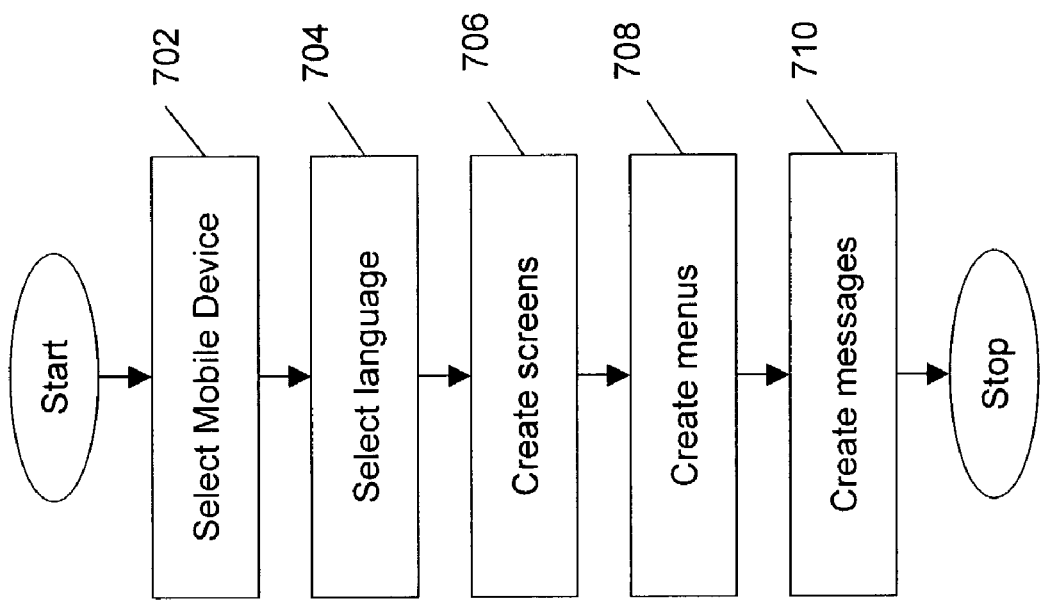
FIG. 7 is a flowchart that shows the process for configuring mobile devices and a mobile agent using Mobile Device Configurator.
Figure 8:
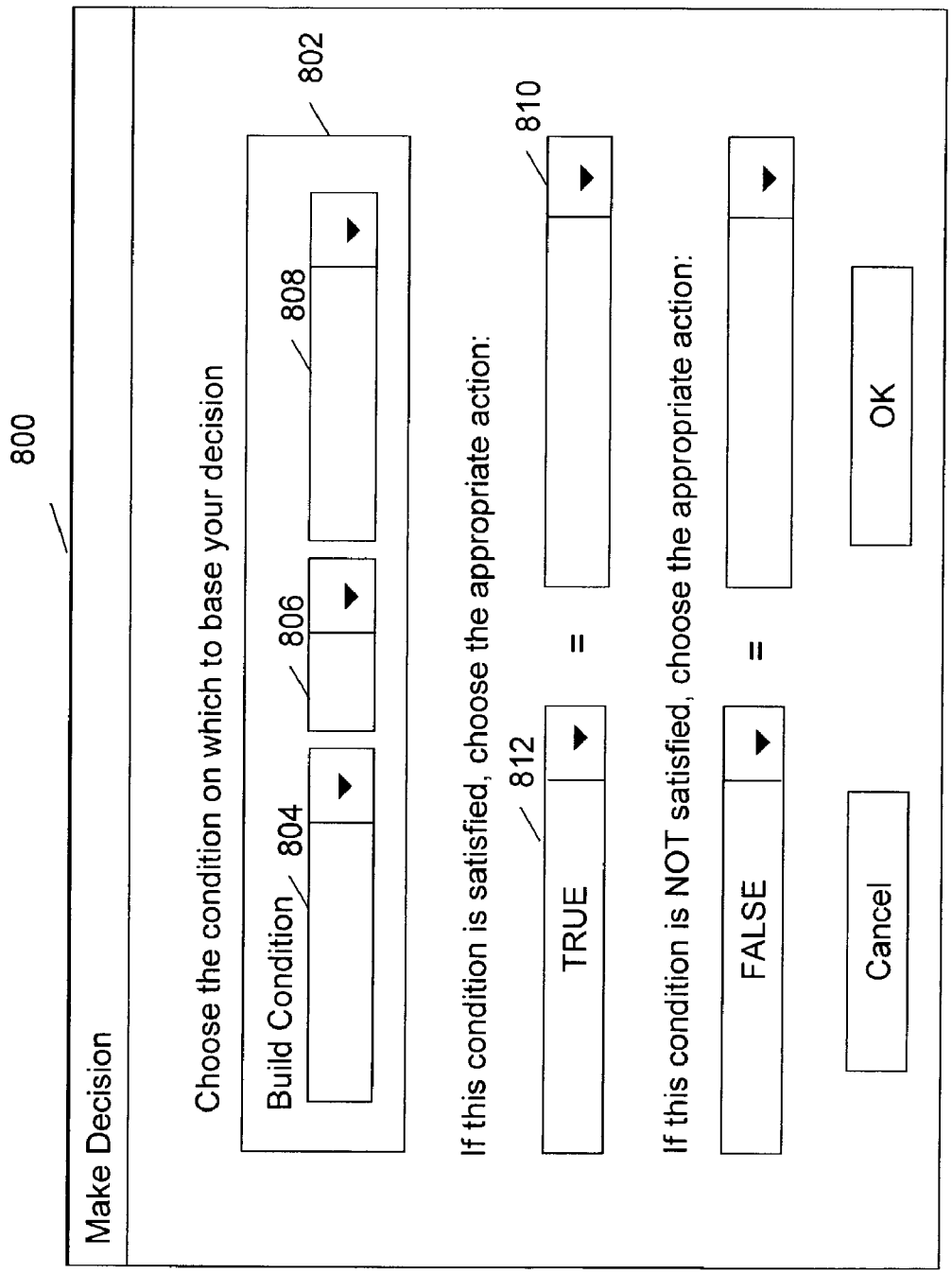
FIG. 8 is a representative example of a wizard provided by Business Logic Generator that assists a developer in defining logic for a WAG solution.

The process used by MDC 306 for configuring Mobile Agent 110 for different mobile devices, is shown in flowchart of FIG. 7. At step 702, the developer selects the required mobile device from drop down list provided by a GUI. The drop down list provides all the mobile devices that are supported by MMS 302. In case the developer does not select a mobile device, a default device is specified. At step 704, the developer specifies a language in which information needs to be presented on the mobile device. The developer selects the language from the drop down list provided by GUI. Drop down list provides all the languages that are supported by MMS 302. A default language is specified in case the developer does not select any language. At step 706, developer creates screens by defining various screen elements for a WAG solution. The screen elements include—process fields, screen fields, labels, action keys and screens.

A field is a variable through which a value can be defined, stored and displayed on the screen of a mobile device. Value of a field can be specified by the user, generated by an intermediate computation or set by retrieving a value from the backend system. A default value is given to a field at development time. The default value can be overwritten at run time. For example, an ATM machine displays "please enter your PIN number" to the user and provides space for entering PIN number. This space where the user enters PIN number is called a field. Fields are of two types: Process fields and Screen Fields. Process fields are defined for the process and can be used in any of the screens of the process. Value for a Process field is defined in one screen and can be used with any other screen of the process. Property attributes of Process fields are applicable for all screens that are related to the WAG solution. The property attributes include—index number of fields for the process, Field name and default value. Screen fields are subsets of process fields. Screen fields are defined for a single screen only. Screens fields process the functionality of one particular screen. Additional property attributes are added in Screen fields to specify values specific to the usage in a screen. Various attributes associated with this field include "Width" (the maximum number of characters for the PIN number), "type" (password type is masked (not displayed) as it is typed in, but is replaced with another character, such as "*"), "scannable" (if input can be scanned using a barcode scanner), etc.

A label is a string of text composed of printable ASCII characters. A label is defined for use only in a single screen. Considering the above ATM example again, the text "Please enter your PIN number" is displayed on the screen using a label. In a preferred embodiment, contents of a label are defined in Development Environment 102 (using the MDC 306), and cannot be changed at run time. There is no limit to the number of labels allowed for use in a screen. Screen field property is defined for each label. These properties include index number of label for a screen, text of label, row number of first character and column number of first character.

A key may be defined as key of the keyboard that is to be pressed for execution of an action. For devices without keyboards, the key indicates a button. The action to be performed is associated with the key using BLG 308. For the abovementioned ATM example, the screen may have a button with a label: "After entering PIN, press this button". When the user presses that button, the steps will get executed to further process the entered PIN number. While using a key in a screen, properties like index number of the key and name of the keyboard key are specified.

A screen consists of defined labels, fields and keys and reflects the status of the process being executed. A process may relate to one or more screens. The information to be displayed to the user is defined using labels. Information to be entered by the user is defined using fields. The action to be executed after entering or viewing the information is executed by pressing a key. After the action key is pressed, the system executes the respective action and proceeds to next screen.

At step 708, menus are defined using MDC 306. A menu comprises of a list of items a user can select. These items can be calls to processes or to other menus (sub menus). In a preferred embodiment, two keys are defined for a menu screen—Escape key and Enter key. Escape key is mapped to the previous screen and takes the user to the screen from which the displayed menu screen was called. Enter key is mapped to executing the action associated to the menu item. Thus, in step 708, the developer defines the menu items and the action keys for executing the processes related to these menu items.

At step 710, the developer creates messages that are used to convey information to users. Messages are of three types namely—'Failure', 'Success with Information' and 'User Response'. Failure message is displayed to the user in case execution of an action fails. This message displays specified text to the user. The WAG solution does not execute further after the failure message. 'Success with Information' message is displayed when an action is successfully executed. The developer may also allow display of certain field values along with text lines in this message. After a success message is displayed, subsequent steps/actions in the WAG solution are carried out. 'User Response' message is used when System 100 needs input from user for execution of an action. 'User Response' message displays the options available as lines of text and allows the user to select an option.

BLG 308 allows the developer to build and execute business logic (for a WAG solution) as a sequence of steps associated with the screen elements. Business logic for a WAG solution is developed by attaching sequences, decisions and actions to the screen elements. The WAG solution progresses from one screen to the next screen when a step executes successfully. The steps of a WAG solution may include simple tasks like moving to next screen or complex tasks like retrieving data from an enterprise backend system, altering data according to the requirement and displaying the data on a screen. BLG 308 provides a number of wizards that are used by the developer to define the steps in a WAG solution. Wizards are pre-built software programs that are dedicated to perform a particular task. Wizards present only the appropriate fields and data elements applicable for a step based on the screen elements. A developer, while defining steps of a WAG solution, chooses appropriate wizards. Based on the WAG solution for which the business logic is being built, the screens to which the user can navigate to, may be listed in the form of a drop down list. If needed, additional values are defined in the wizards for defining steps of the WAG solution. Wizards execute the codes associated with them when they are triggered. Thus, BLG 308 allows the developer to develop the WAG solution without going into programming complexities. As a result a business developer having no knowledge of programming can create complex WAG solutions. The rules as created by BLG 308 are stored in Rules Repository 906 (in FIG. 9). Apart from wizards, external objects like objects for managing email, can also be integrated in System 100 and used to build rules in BLG 308.

BLG 308 also houses the Run-time Code Generator, which is an internal module of BLG 308. The Run-time Code Generator combines the configurations specified by the developer in the MDC 306, the BLG 308, and the BSCC 304 during the development of the WAG solution. The Run-time Code Generator then generates the high level code in XML, which encapsulates the screen design and the process steps (input by the developer).

The list of wizards provided in System 100 from which the developer chooses an appropriate wizard to define a process step includes—'Call SAP RFC' wizard to call a SAP RFC in real-time, 'Send SAP IDOC' wizard to call a SAP IDOC, 'Make Decision' wizard to allow the developer to select a process step based on a condition and 'Next Screen' wizard to go to the next screen. Also, there is a 'Copy Process' wizard for enabling the developer to use code developed for one WAG solution in another WAG solution, a 'Math Operation' wizard which allows for carrying out mathematical operations, a 'Print' wizard that allows to print labels and reports from the mobile device, an 'Oracle PL/SQL Execution' wizard that allows for the execution of PL/SQL code, a 'Data Conversion' wizard, which allows conversion of data entered to a date, integer, time, upper/lower case format and an 'Execute External Function' wizard that allows for the execution of a function outside of System 100. Examples of some other wizards provided by the BLG 308 include: 'Get User Response', 'Send Message', 'Call Data Repository', 'Call Custom Functions', 'Assign Values' 'String Functions' and 'Advanced Steps'. It will be apparent to one skilled in the art that the list of wizards that is provided to the developer by System 100 may also include other wizards (depending on the functional requirements of the WAG solution). For instance, a WAG solution that involves access to Siebel and Oracle databases may involve the use of wizards designed for working with these databases. Thus, System 100 may have 'Insert Business Component' wizard, 'Update Business Component' wizard, 'Query Business Component' wizard and 'Remove Business Component' wizard for inserting, updating, querying and removing business components downloaded from Siebel system into System 100.

Some of the wizards provided by the BLG 308 are explained below in greater detail.

'Make Decision' wizard 800 enables the developer to develop a step to test for a condition and then determine the action to be taken based on the evaluation of the condition. The condition statement 802 provided with 'Make Decision' wizard consists of a left side field 804, an operator field 806 and a right side field 808. The developer fills the left side field 804 by selecting an appropriate value from a provided drop down list. The value selected for the left side field 804 can be taken from a global storage variable, records of database or messages. Operator field 806 is filled by choosing an appropriate Boolean operator from the provided drop down list of Boolean operators. Examples of such Boolean operators are—"<" (smaller than), ">" (greater than), "=" (equal to), etc. The right side field 808 is filled by entering the value to be tested by the condition. 'Make Decision' wizard 800 in BLG 308, provides the developer the flexibility to associate output (true or false) of the condition with actions, such as "go to next step", "go to next screen" or "display a message". For example, the developer may specify an action (from a drop down list) in field 810 and associate this action with the output 'true' 812 of the condition 802. Similarly, the developer also associates an action with the output 'false' of condition 802. 'Call SAP Remote Function Call (RFC)' wizard is used to call a SAP BAPI/RFC in real-time. The developer defines the name of the BAPI/RFC to be called using this wizard. The developer also defines the input parameters required by the BAPI/RFC and the output parameters generated by the BAPI/RFC using 'Call SAP RFC' wizard. When 'Call SAP RFC' wizard is triggered it takes the user's query as the input parameter and sends it to SAP for execution. The query entered by the user on the screen of the mobile device is mapped to the input parameter of the BAPI/RFC. The developer specifies this mapping while developing the WAG solution. The execution result is sent to the output parameter of BAPI/RFC or to a table. The developer maps this output parameter/table to a pre-specified location in System 100 Data Repository 904 (shown in FIG. 9). 'Send SAP IDOC' wizard is used to call a SAP IDOC. The developer defines the name of the IDOC to be called using this wizard. The developer also defines the input parameters required by the IDOC and the output parameters generated by the IDOC using 'Send SAP IDOC' wizard. Using this wizard, the developer can define the name of the relevant IDOC and the input and output parameters required by the IDOC. The query entered by the user on the screen of the mobile device is mapped to the input parameter of the IDOC. The execution result is sent to the output parameter or to a table. The developer maps this output parameter/table to a pre-specified location in Data Repository 904 (shown in FIG. 9) of System 100.

'Next Screen' wizard is used by the developer to specify a subsequent screen to be displayed on mobile devices upon execution of a particular action (in the displayed screen). All the possible screens that can be navigated by the user based on the WAG solution are provided to the developer. The developer selects the required screen thereby defining the sequence of screens to be displayed while execution of the WAG solution.

'Send Message' wizard enables the developer to send a message to a mobile device screen. 'Send Message' wizard allows the developer to select required message from a list of messages. The list includes all the messages that are available in MDC 306. The developer is also provided with an option to send a specified text as a message. Also, the developer is provided an option to select a field of the WAG solution so that the field's contents could be displayed in the message.

Figure 9:
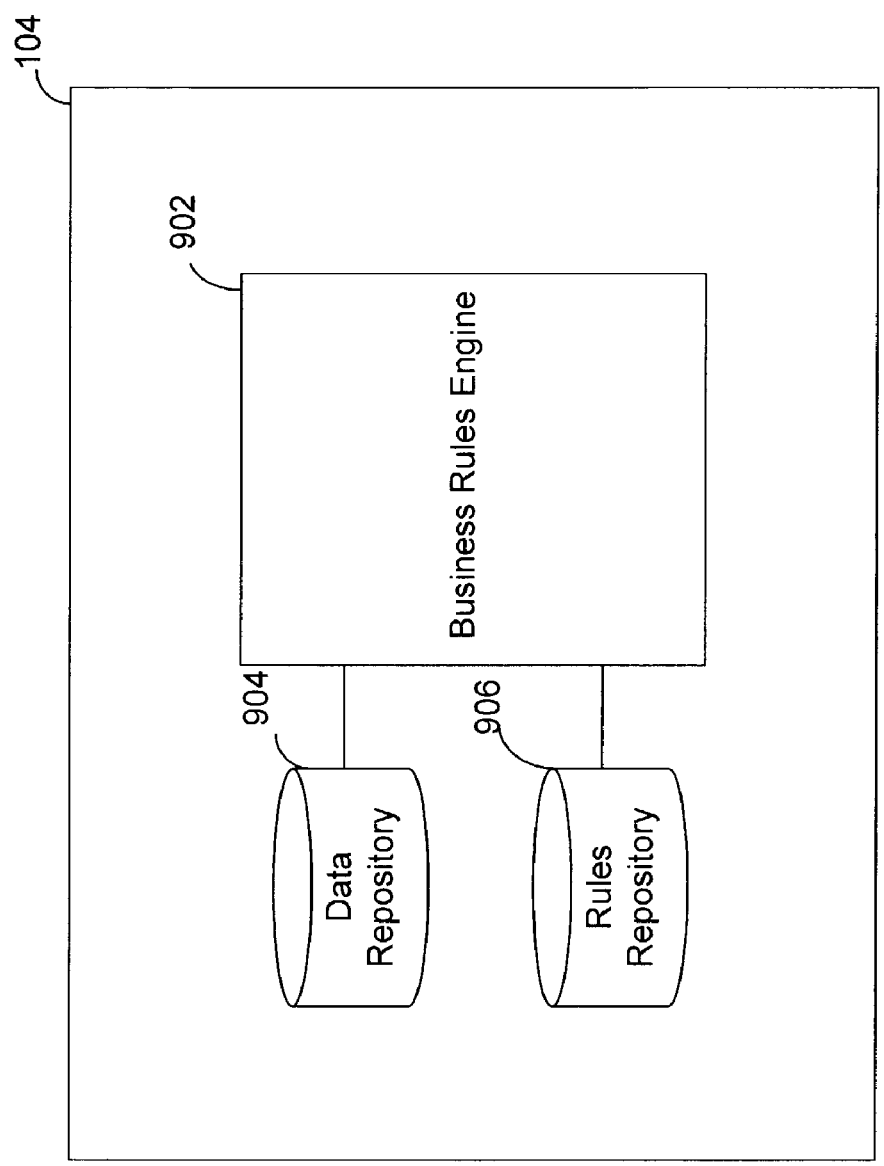
FIG. 9 is a schematic representation of the components of Execution Environment provided by the abovementioned system.

FIG. 9 is a schematic representation of Execution Environment 104 in accordance with a preferred embodiment of the invention.

Execution Environment 104 includes a Business Rules Engine (BRE) 902, a Data Repository 904 and a Rules Repository 906. BRE 902 executes the steps of the WAG solution. As described earlier, these steps have been developed by a business developer intuitively using graphical interfaces. In a preferred embodiment, these steps are in the form of a XML code. Execution of this code enables the mobile access of an enterprise backend system at runtime in Execution Environment 104, thereby implementing the WAG solution. Thus, a runtime version of WAG configured for a given set of enterprise backend systems and a given set of mobile devices is generated upon execution of the code. The business logic developed in Development Environment 102 is thus executed in a stepwise manner by BRE 902. This execution of code uses data from Data Repository 904 and rules from Rules Repository 906 (stored at the time of development). BRE 902 also has a break handling mechanism, to handle cases where a transaction cannot be carried out due to some failure. For example, if a database of a particular backend system is dysfunctional, the break handling mechanism of BRE 902 tells the user that the transaction cannot be carried out due to non-availability of the database.

Data Repository 904 stores all the data required for the implementation of the WAG solution. This data includes screen definitions for the mobile devices, and the data required for the identification of the backend enterprise systems. In a preferred embodiment, this data is in XML. Rules Repository 906 contains the business logic rules developed by a business developer using graphical interfaces or wizards of BLG 308. Preferably, the business logic rules are also in XML.

Figure 10:
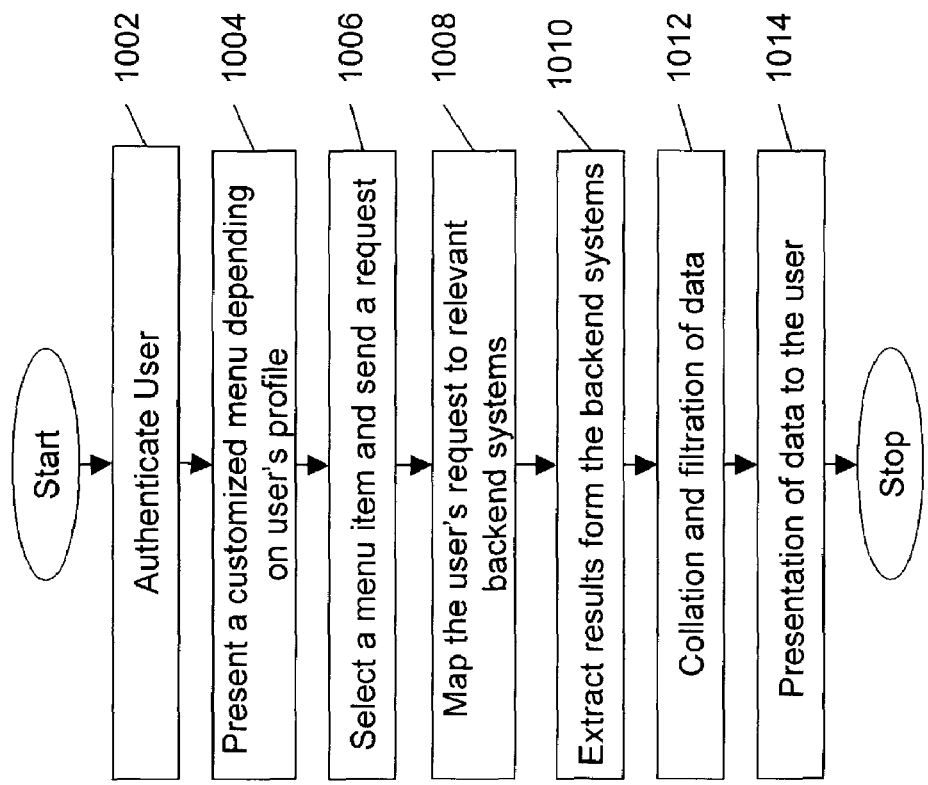
FIG. 10 is a flowchart that shows the process of execution of a Wireless Application Gateway (WAG) solution for enabling access to Enterprise Backend Systems through mobile devices.

FIG. 10 is a flow chart that illustrates the steps by which a user is able to access enterprise backend systems using mobile devices. The user sends a request to System 100 to access the enterprise backend systems.

At step 1002, the user is authenticated. In a preferred embodiment, the user is provided with a username and a password for authorization. The user inputs this username and password for logging into the system. The user needs to log into each enterprise backend system he/she needs to access. The login details of each backend system are stored in the user's profile, which in turn is stored in System 100. Thus, the user needs to provide login details of the backend systems only for his/her first access to the backend system In an alternate embodiment, the IP address of the calling device may also be used to identify a user, i.e. the mobile calling device may be authorized (by its IP address), instead of authorizing the user. There is a distinct advantage of using this particular embodiment. Consider a case when a mobile user is connected to System 100. Suppose that the user gets disconnected from System 100 for a short duration of time (say, due to temporary non-availability of wireless network). Whenever the connection is re-established, System 100 identifies the device with which it was connected using the IP address of the device. It then continues the session with the user by presenting the same screen, which was being displayed to the user when the connection was lost. The user need not provide login details again for this transaction.

A login session may be terminated at the behest of the user. Also, the session may terminate after a defined period (called session-out time), if there has been no user interaction in that time period. Providing a session-out time to a mobile user enables the mobile user to continue transactions with System 100 without logging in again even if he/she is disconnected from System 100 for a brief period of time. For instance, consider a mobile user who is interacting with System 100 when his/her car is entering a tunnel. Though the user may temporarily lose connection with System 100 due to non-availability of the wireless network inside the tunnel, the connection is immediately re-established with System 100 (without the need of a re-login) as soon as the access to wireless network becomes available.

Note that there may be different session-out times defined for different users. These session-out times for users may be defined in MMS 302 during the development of a WAG solution. For instance, a WAG solution may use two different session-out times—a mobile sales agent covering the sales in a countryside Texas may have a longer session out time than a mobile sales agent covering the sales in Houston. Session-out times are defined for each mobile user during the development of a WAG solution. In such a case, parameters, such as the profile of the user, the kind of mobile device being used, data transfer speed of the network that connects the mobile device, and other such parameters may be considered to determine the session-out time.

Once the user has been authenticated, at step 1004 the user is presented with a menu on the screen of his/her mobile device. This menu is customized as per the user's profile, which in turn is determined by the login details provided by the user. The login details and profile of each user is stored in Data Repository 904 in System 100. The list of all processes, that the user has authorization to access, is also stored here. This information gets stored at the time of development of the WAG solution. System 100 uses this information to determine the customized menu that has to be presented to the user.

At step 1006, the user selects a menu item on the screen of his/her mobile device. This menu item may be an action request, such as retrieving annual revenues of enterprise for year 2001 from a sales report database, obtaining a list of cable TV experts with five years of experience, etc.; or a navigation request, such as displaying the menu of accessible sub-applications in SCM applications, etc. Some of these requests, such as a few action requests, may require specific inputs from the user. Upon selection of a menu item, a request is sent to System 100, which then returns an appropriate screen and displays it on the mobile device. Depending on the request sent, the displayed screen might either address the user's request completely (e.g., displaying annual revenues for 2001), or display a new customized menu for addressing the user's request (e.g. listing accessible sub-applications in an SCM application). This process continues till the user's request is appropriately addressed.

To illustrate step 1006 more clearly, consider the following example. An HR manager requires a list of electrical engineers in cable TV industry with more than five years of work experience. The manager logs into System 100 and a menu is displayed on his/her mobile device. He/she then selects "Human Resource Management (HRM)" application and a new customized menu is displayed on the screen. He/she then selects "resource tracking" sub-application and obtains a query screen from System 100 in return. He/she then fills in appropriate fields (such as years of experience, etc.) in the query screen and presses a pre-specified key to execute the request. This pre-specified key has a particular action associated with it (and this logic is defined at the time of development of the WAG solution). System 100 then processes this request as is explained below.

At step 1008, System 100 maps the user request onto relevant backend systems of the enterprise. The input is mapped to an API that is selected by the developer at the development time of the WAG solution. At the development time, the developer selects relevant API from a list of available APIs, which will be used to satisfy the user request. Additionally, the developer maps the user inputs on to the API input parameters. When the user makes a request by pressing a button on the screen, System 100 calls the corresponding API. Thus, in the discussed example, input "five years of experience" is mapped into input parameter of the API corresponding to the HR database. System 100 then uses DBC 106 to send the input parameters and a command to the enterprise backend systems to execute applications within the enterprise backend systems.

At step 1010, the relevant results are extracted from the backend system and sent to System 100. The results are sent to System 100 by the use of output parameters of the API. The results so obtained are stored in pre-defined locations in the Data Repository 904 of System 100. These locations are defined by the developer during the development of the WAG solution.

At step 1012, the data that is to be presented to the end user over the mobile device is collated and filtered. The filtering can take place at two levels. At the first level of filtering, the data extracted from the backend systems is collated and data that is to be presented to the mobile user is extracted. This may be done by using Boolean operators, such as an 'And' operator or an 'Or' operator, or a combination thereof. For example, for the query "electrical engineers in cable TV industry with five years of experience", each backend system comes up with a list of electrical engineers that have five years of experience in cable TV industry. The lists from various backend systems may have common entries. For instance, information regarding an electrical engineer, say John Smith, may be extracted from an HR database as well as from an Engineer's database. However, System 100 should ensure that the name of John Smith should figure only once in the list provided to the mobile user so that irrelevant (repetitive) information is not displayed. In such cases, System 100 may use an 'Or' operator to compile a list that has no dual inclusions. Consider another example in which one backend system sends a list of all electrical engineers available in its database, another backend system sends a list of all engineers that work in cable TV industry and a third backend system sends a list of all engineers with five years of experience. In this case, System 100 uses an 'And' Boolean operator to filter out engineers that are present in all of the three lists. Thus the extracted list, in this case, has electrical engineers that have five years of experience in cable TV industry.

A second level of filtering takes place to make the data presentable on a screen of the mobile device of the user. This filtration is used to weed out irrelevant data before presenting it to the user so that the amount of data to be represented to the user is minimized. Note that mobile devices are connected to System 100 over a mobile network that offers a low data transmission bandwidth. Also, the screens of mobile devices are typically small. This is in contrast to presenting the data to a client through web server, in which high-speed transmission lines are used. Also, the size of the desktops of PCs is large enough to support presentation of large amount of data at a time. To illustrate the difference more clearly, consider an example wherein after the first level filtering, System 100 comes out with a list of 50 electrical engineers having five years of experience in cable TV industry. Presenting all the information, such as name of the engineer, years of experience, industry area, etc., for 50 engineers is feasible in case the user device is a desktop PC. However, presenting this on the screen of a mobile device, such as a PDA, may be problematic. In order to facilitate this presentation, System 100 applies second level of filtration to the list of 50 engineers. The second level of filtration may be a simple 'priority function' or a complex filtration function. Thus, in the example, System 100 can prioritize the list of engineers on the basis of their experience and present top five engineers (in terms of experience) to the mobile user. The second level of filtration may also include presenting only selected information to the user. Thus, in the example, System 100 may only present the name and years of experience of engineers to the mobile user, thereby reducing the amount of information to be presented on the mobile device. For a WAG solution, this filtering method may be programmed in the MDC 306 during the development of the WAG solution. System 100 may also provide a choice to the user by which he/she can scroll through the remaining relevant information (which includes other details corresponding to a displayed entry as well as list of other relevant entries). For example, this may be done by providing a left-right scroll features by which a user can access other information for the displayed entry, and by an up-down scroll feature by which the user can view other entries in the priority list. Also, System 100 may provide an option to the mobile user by which he/she may specify the parameter by which he/she wants to prioritize the presented information. Thus, a user may choose to view top five engineers in terms of their specific sub-domains in the cable TV industry.

At step 1014, the filtered data is presented to the mobile user. The presentation of data is done by the presentation layer of System 100. The presentation layer presents customized screen layouts and screen formats to mobile devices. Also, the Presentation layer transforms the data to make it suitable for presentation on mobile devices. The transformation is achieved in order to meet the constraints of the mobile device. Note that there may be different presentation layers for different mobile devices (PDAs, Mobile phones, iPAQs, etc.)

When System 100 is implemented by an enterprise, there are two aspects of security to be considered.

First aspect of security relates to the security within the enterprise. This aspect does not pose any problems as System 100 rides "over the security layer". In other words, System 100 and the enterprise backend systems reside on the same side of the firewall.

Second aspect of security is outside the enterprise security, i.e. security from System 100 to the mobile device. The mobile device may be connected to System 100 using a public network (Wireless Wide Area Network (WWAN)) based on GPRS, CDMA, CDPD, etc. The mobile devices contain a very small element of client software (of System 100) on the device, which may be downloaded onto these mobile devices. Since the functionality of this software component is limited to just receiving and sending information, and since it does not have many "smart" capabilities of formatting the information, it is called a thin client. The thin client software, once loaded on to the client software does not have to be changed at all. All the changes are made only in the BLG 308 in Development Environment 102. This is because all the smart features of formatting for that particular mobile device are on the Mobile Agent 110, which resides on Server of System 100. The Mobile Agent 110 knows the type of mobile device it is communicating with, formats the information and sends it to the mobile device. During a transaction, only the relevant information for that transaction is transferred from server of System 100 to these mobile devices. Before a user initiates a transaction, a secure connection is established between the client and System 100. It is necessary to establish a secure connection so that any unscrupulous element cannot access and extract the transaction details from the network. Essentially, the information that is exchanged between the mobile device and System 100 over the Internet is encrypted. Another way of securing this connection is by establishing a Virtual Private Network (VPN) over the communication channel. A third party vendor may provide VPN. Facility of establishing a VPN may also be provided in the mobile device itself. For instance, Microsoft iPAQ is capable of establishing a VPN. Also, the enterprise may "VPN enable" the mobile devices that may be used to access the enterprise backend systems. System 100 is independent of which software is used for establishing this secure channel, as long as the IP address of System 100 and the client is maintained for the duration of the session.

In an alternate embodiment, the mobile devices may connect to the System 100 using the enterprise's Wireless Local Area Network (WLAN) in addition to other available wireless networks and Wireless Wide Area Network (WWAN). In such a case, in addition to considering the type of mobile device, the wireless network connection is also considered while developing the WAG solution. For instance, the amount of data to be transferred to WLAN connected mobile devices may be specifically programmed using MDC 306. Also, mobile devices may access the WLAN using wireless access points located at different locations in the enterprise. These access points may use any standard communication protocol, such as Bluetooth, HomeRF, IEEE 802.11, etc.

As WLAN offers higher bandwidth for data transfer, a higher amount of data may be transferred to mobile devices that are connected to System 100 using the WLAN. Thus, a mobile device, which receives the list of electrical engineers in set of, say, three engineers per list, through WWAN, receives the list in set of, say, ten engineers per list.

In case a mobile device uses a WLAN to access the enterprise backend system, then the security of the network is determined by the enterprise security protocol. In such a case, System 100 access is independent of the security protocol being used. Thus, System 100 will work on any protocol.

In another alternative embodiment, the transfer of information between the System 100 and a mobile device may be a batch transfer, i.e. information is not transferred at real time. Instead, it is transferred in batches, either at predefined times or on the basis of network availability. A batch transfer may be carried out if the client device is a thick client with memory and processing capabilities. In such a case, a user of the mobile device may conduct all the transactions offline. Whenever, the mobile device connects to a wireless network (in order to connect System 100), all offline transactions done by the user are uploaded into System 100. Similarly, all the data that needs to be downloaded to the thick mobile client is downloaded from System 100 to the mobile device (when the mobile device is connected). In this embodiment, System 100 may be provided with "batch agents" that are executed in order to enable batch transfer; information related to the transaction, such as time stamp information may be stored by the use of these "batch agents".

ADVANTAGES

The invention provides a graphical development toolkit for development of a WAG solution without any programming. Using the wizards and GUIs provided by the development toolkit, a developer can develop WAG solution simply by selecting options through "point and click" configuration. The developer can be a business analyst having no programming knowledge. The graphical development toolkit also prevents the developer from making mistakes as are common while writing code.

The invention provides wireless access not only to databases but also to complex business applications of the enterprise.

The invention also allows the user to work with the business components of different enterprise backend systems without knowing about the intricacies of these business components.

The invention allows a WAG solution to be deployed quickly (in a matter of two to four weeks) and seamlessly.

Using the invention, WAG solutions can be built for all levels of the enterprise using the data gathered at the time of development. The WAG solution provides transparency of data where each level in the enterprise is presented with the data based on its profile. Thus, a production manager can access data related to production processes whereas a director can access a summary about status of different processes in the enterprise.

The invention also provides code transparency to enable code reuse by using code corresponding to a WAG solution for another WAG solution.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A system for developing and testing a wireless application gateway solution, the wireless application gateway solution enabling remote access of selective enterprise backend systems to the users through mobile devices, the system comprising:
   a. a business logic generator for developing a business logic for the wireless application gateway solution, the business logic being defined as steps that are to be performed in order to execute the wireless application gateway solution;
   b. a backend system connector configurator for configuring a plurality of dynamic business connectors to enable exchange of data with the enterprise backend systems, the dynamic business connectors interfacing an execution environment with the enterprise backend systems;
   c. a mobile device configurator for configuring the screens for a plurality of mobile devices to enable exchange of data with the mobile device;
   d. a mobile management studio for creating and administrating a wireless application gateway project, the wireless application gateway project being created for a particular wireless application gateway solution; and e. means for testing a developed wireless application gateway solution.

2. The system as recited in claim 1 wherein the business logic generator further comprises a run-time code generator for generating a code for the wireless application gateway solution, the code being executed in an execution environment in order to execute the wireless application gateway solution.

3. The system as recited in claim 2 wherein the run-time code generator generates an XML code, the XML code being executed in order to execute the wireless application gateway solution.

4. The system as recited in claim 1 wherein the business logic generator further comprises a plurality of wizards for assisting a developer in developing a wireless application gateway solution without programming, the wizard being pre-built software programs that are dedicated to guide a developer to build a wireless application gateway solution.

5. The system as recited in claim 4 wherein the plurality of wizards comprises:
   a. a call SAP Remote Function Call (RFC) wizard for enabling the developer to call a specified SAP RFC;
   b. a send SAP Interface Document (IDOC) wizard for enabling the developer to call a specified SAP IDOC;
   c. a next screen wizard for enabling the developer to specify a screen that is to be displayed after a particular screen;
   d. a make decision wizard for enabling the developer to specify a step to be taken after evaluating a given condition;
   e. a send message wizard for enabling the developer to specify a message to be sent to the screen of a mobile device; and
   f. a copy process wizard for enabling the developer to use code developed for one wireless application gateway solution in another wireless application gateway solution.

6. The system as recited in claim 1 wherein the backend system connector configurator further comprises a plurality of interface modules for developing an interface for exchange of data with the enterprise backend systems, each interface module developing an interface for one backend system, the Backend System being a database system, an application or an sub-application in the enterprise backend systems.

7. The system as recited in claim 1 wherein the mobile device configurator further comprises:
   a. a plurality of screen modules for developing screens for mobile devices, each screen module developing screens for one type of mobile device;
   b. a plurality of screen elements, the screen elements being used for developing the screens for the mobile devices, the screen elements comprising:
      i. a field for defining and displaying data on the screens;
      ii. a key for enabling the user to transfer a request to the system;
      iii. a message for conveying a pre-specified information to the user in response to a user request; and
      iv. a label for conveying an information to the user, the information being displayed on the screens of the mobile device.

\* \* \* \* \*